United States Patent
Matsumoto (10) Patent No.: US 9,274,491 B2
(45) Date of Patent: Mar. 1, 2016

(54) POWER SUPPLY APPARATUS AND IMAGE FORMING APPARATUS

(71) Applicant: CANON KABUSHIKI KAISHA, Tokyo (JP)

(72) Inventor: Shinichiro Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/404,949

(22) PCT Filed: Jul. 31, 2013

(86) PCT No.: PCT/JP2013/071292
§ 371 (c)(1),
(2) Date: Dec. 1, 2014

(87) PCT Pub. No.: WO2014/021474
PCT Pub. Date: Feb. 6, 2014

(65) Prior Publication Data
US 2015/0117075 A1    Apr. 30, 2015

(30) Foreign Application Priority Data

Aug. 1, 2012   (JP) .................................. 2012-171145
May 20, 2013  (JP) .................................. 2013-106152

(51) Int. Cl.
| | | |
|---|---|---|
| G03G 15/00 | (2006.01) |
| H02M 1/12 | (2006.01) |
| H02M 7/06 | (2006.01) |
| H02J 7/00 | (2006.01) |
| H02J 7/34 | (2006.01) |
| H02M 1/32 | (2007.01) |

(52) U.S. Cl.
CPC .............. *G03G 15/80* (2013.01); *H02J 7/0063* (2013.01); *H02J 7/345* (2013.01); *H02M 1/126* (2013.01); *H02M 7/06* (2013.01); *H02M 2001/322* (2013.01)

(58) Field of Classification Search
CPC ........ G03G 15/80; H02J 7/0063; H02J 7/345; H02M 7/06
See application file for complete search history.

(56) References Cited

U.S. PATENT DOCUMENTS 5,101,252 A    3/1992   Matsumoto
7,355,864 B2   4/2008   Matsumoto
(Continued)

FOREIGN PATENT DOCUMENTS

| EP | 2 408 094 A2 | 1/2012 |
| JP | 2001-306160 A | 11/2001 |
| JP | 2007-312456 A | 11/2007 |

OTHER PUBLICATIONS

U.S. Appl. No. 14/610,413 filed by Shinichiro Matsumoto Jan. 30, 2015.
(Continued)

*Primary Examiner* — G. M. Hyder
(74) *Attorney, Agent, or Firm* — Fitzpatrick, Cella, Harper & Scinto (57) ABSTRACT

The discharge circuit includes plural resistors connected in parallel to a capacitor and connected between input lines. When input of an alternative voltage has stopped, the plural resistors form plural discharge paths to remove charges accumulated in the capacitor, thereby removing the charges in the capacitor connected between the input lines of the alternative voltage.

16 Claims, 8 Drawing Sheets

(56) References Cited

U.S. PATENT DOCUMENTS

| | | |
|---|---|---|
| 7,564,695 B2 | 7/2009 | Matsumoto |
| 7,577,004 B2 | 8/2009 | Matsumoto |
| 7,595,546 B2 | 9/2009 | Matsumoto |
| 8,428,155 B2 | 4/2013 | Matsumoto |
| 8,903,263 B2 | 12/2014 | Matsumoto |
| 2003/0031035 A1 | 2/2003 | Kitano |
| 2005/0248968 A1* | 11/2005 | Chang .......................... 363/125 |
| 2008/0074910 A1* | 3/2008 | Casteel et al. ................. 363/54 |
| 2013/0279134 A1 | 10/2013 | Hayashi et al. |
| 2014/0301114 A1 | 10/2014 | Matsumoto |

OTHER PUBLICATIONS

International Preliminary Report on Patentability filed in International Patent Application No. PCT/JP2013/071292 on Feb. 12, 2015.
International Search Report and Written Opinion for PCT Application No. PCT/JP2013/071292, dated Mar. 19, 2014.

* cited by examiner

POWER SUPPLY APPARATUS AND IMAGE FORMING APPARATUS

TECHNICAL FIELD

The present invention relates to a power supply apparatus connected to a commercial power supply, and an image forming apparatus including the power supply apparatus.

Figure 5A:
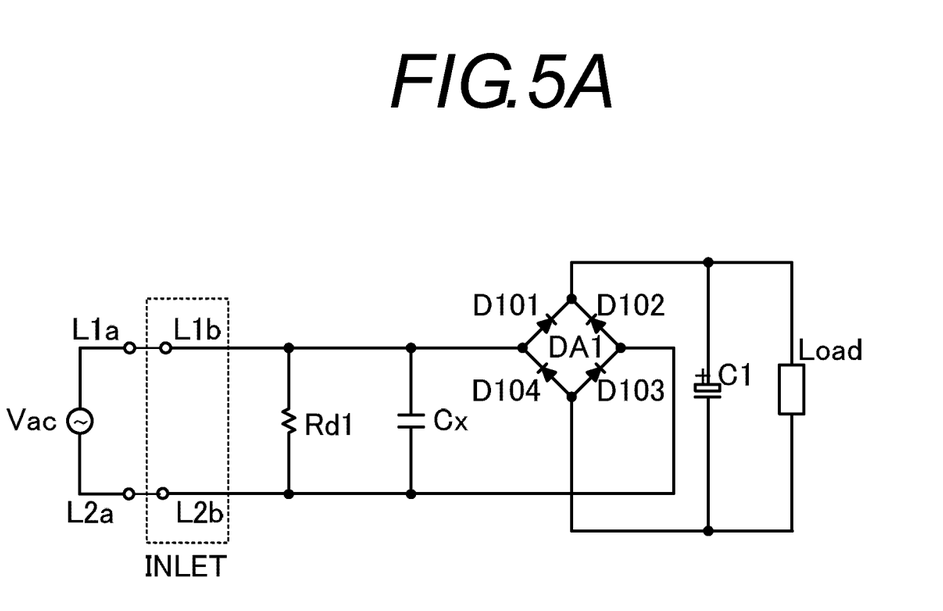
FIG. 5A is a circuit diagram showing the arrangement of a conventional power supply apparatus.

FIG. 5A shows an electronic device including a conventional power supply apparatus. Note that details of reference numerals will be explained in the embodiments to be described later. In the electronic device having this arrangement, when inlets L1$b$ and L2$b$ are pulled out of outlets L1$a$ and L2$a$, a voltage accumulated in an across the line capacitor (to be referred to as an X capacitor hereinafter) Cx is observed between the power-supply lines (to be referred to as "between the inlets L1$b$ and L2$b$" hereinafter). However, generating a high voltage between the inlets L1$b$ and L2$b$ for a long time after pullout of them is not preferable. To prevent this, providing a discharging resistor Rd1 in parallel to the X capacitor Cx is known (for example, Japanese Patent Application Laid-Open No. 2001-306160).

Figure 5B:
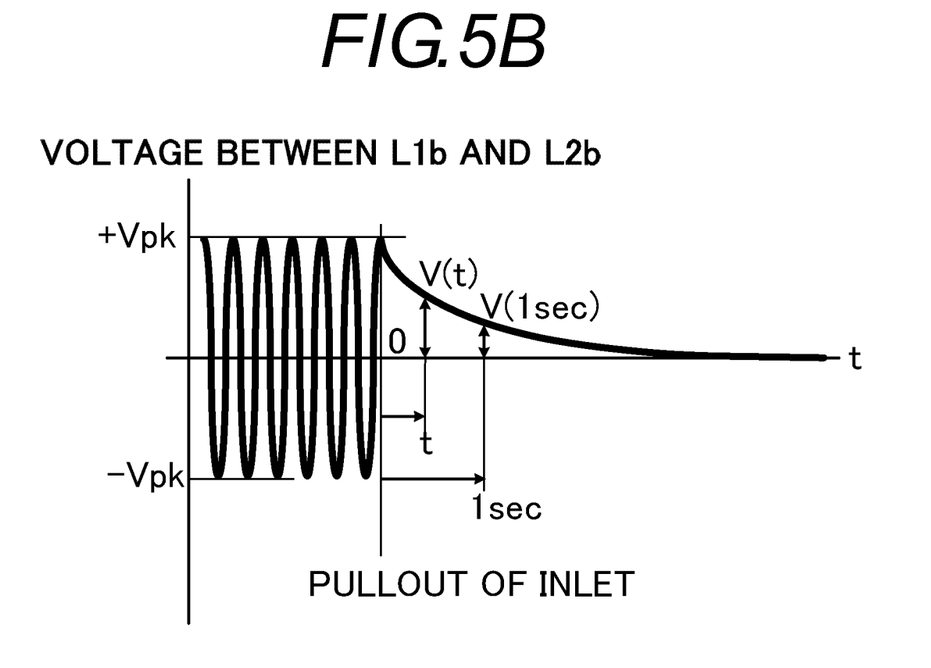
FIG. 5B is a graph showing a discharge curve between inlets upon pulling out them in the power supply apparatus shown in FIG. 5A.

FIG. 5B shows a voltage waveform between the inlets L1$b$ and L2$b$ after pullout of them. In FIG. 5B, the abscissa represents time, and the ordinate represents the voltage between the inlets L1$b$ and L2$b$. When the inlets L1$b$ and L2$b$ are pulled out of the outlets L1$a$ and L2$a$ at time 0, +V$_{pk}$ (the peak value of the commercial power supply voltage) is generated between the inlets L1$b$ and L2$b$ at maximum. This voltage is the voltage accumulated in the X capacitor Cx, which is then removed via the discharging resistor Rd1 and lowers. This voltage drop curve is a so-called RC discharge curve, and is approximately expressed using the time t and a voltage V(t) between the inlets L1$b$ and L2$b$ as $$V_{(t)} \cong V_{pk} \cdot e^{-\frac{t}{\tau}} \quad (1)$$

where $\tau$ is a value called a time constant. Letting $r_0$ be the resistance value of the discharging resistor Rd1, and c be the electrostatic capacitance of the X capacitor Cx, $\tau$ is approximately given by $$\tau \cong r_0 \cdot c \quad (2)$$

In general, the voltage V (1 sec) between the inlets L1$b$ and L2$b$ 1 sec after pullout of them preferably has a value equal to or less than 36.8% ($=e^{-1}$: the constant e is the Napier's constant) of an initial value V$_{pk}$, as is represented by $$V_{(1sec)} \cong V_{pk} \cdot e^{-\frac{1}{\tau}} \leq V_{pk} \cdot e^{-1} \quad (3)$$

Hence, the time constant $\tau$ is preferably 1 or less, as is represented by $$\tau \cong r_0 \cdot c \leq 1 \quad (4)$$

Note that when the commercial power supply voltage is a sine wave, a power P consumed by the discharging resistor Rd1 is approximately given by $$P \cong \frac{V_{pk}^2}{2r_0} \quad (5)$$

If the electrostatic capacitance c of the X capacitor Cx is 1.0 [μF], and the peak value of the commercial power supply voltage is 325 [Vdc] (=AC230 [Vrms]×√2), the resistance value $r_0$ of the discharging resistor Rd1 is preferably almost equal to or smaller than 1.0 [MΩ]. In this case, P≈53 [mW] from equation (5).

In this arrangement, if an open fault has occurred in the discharging resistor Rd1, or the discharging function has degraded due to an error in the resistance element of the discharging resistor Rd1, a long time is required to discharge the X capacitor Cx after pullout of the inlets L1$b$ and L2$b$. In this case, a high voltage is generated between the inlets L1$b$ and L2$b$ for a long time.

The present invention quickly lowers the voltage between power-supply lines upon pulling out inlets even if an open fault has occurred in a discharging resistor.

SUMMARY OF INVENTION

Technical Problem

In order to solve the above-described problem, the present invention has the following arrangement.

Solution to Problem

According to the present invention, there is provided a discharge circuit for discharging a voltage charged to a capacitor connected between input lines of a voltage, characterized by comprising a first circuit including plural resistors connected in series and connected between the input lines, and a second circuit including plural resistors connected in series and connected between the input lines, wherein connection parts between the plural resistors of the first circuit and connection parts between the plural resistors of the second circuit are connected.

According to the present invention, there is provided another discharge circuit for removing charges in a capacitor connected between input lines of an alternative voltage, characterized by comprising plural resistors connected in parallel to the capacitor and connected between the input lines, wherein when input of the alternative voltage has stopped, the plural resistors form plural discharge paths to discharge a voltage charged to the capacitor.

According to the present invention, there is provided a power supply apparatus characterized by comprising a capacitor connected between input lines of an alternative voltage, a rectifying and smoothing unit that rectifies and smoothes the alternative voltage and outputs the alternative voltage, a first circuit including plural resistors connected in series and connected between the input lines, and a second circuit including plural resistors connected in series and connected between the input lines, wherein connection parts between the plural resistors of the first circuit and connection parts between the plural resistors of the second circuit are connected.

According to the present invention, there is provided another power supply apparatus characterized by comprising a capacitor connected between input lines of an alternative voltage, a rectifying and smoothing unit that rectifies and smoothes the alternative voltage and outputs the alternative voltage, and plural resistors connected in parallel to the capacitor and connected between the input lines, wherein when input of the alternative voltage has stopped, the plural resistors form plural discharge paths to discharge a voltage charged to the capacitor.

According to the present invention, there is provided characterized by comprising an image forming unit that forms an image, and a power supply that supplies power to the image forming apparatus, the power supply including a capacitor connected between input lines of an alternative voltage, a rectifying and smoothing unit that rectifies and smoothes the alternative voltage and outputs the alternative voltage, a first circuit including plural resistors connected in series and connected between the input lines, and a second circuit including plural resistors connected in series and connected between the input lines, wherein connection parts between the plural resistors of the first circuit and connection parts between the plural resistors of the second circuit are connected.

According to the present invention, there is provided another image forming apparatus characterized by comprising an image forming unit that forms an image, and a power supply that supplies power to the image forming apparatus, the power supply including a capacitor connected between input lines of an alternative voltage, a rectifying and smoothing unit that rectifies and smoothes the alternative voltage and outputs the alternative voltage, and plural resistors connected in parallel to the capacitor and connected between the input lines, wherein when input of the alternative voltage has stopped, the plural resistors form plural discharge paths to discharge a voltage charged to the capacitor.

Further features of the present invention will become apparent from the following description of exemplary embodiments with reference to the attached drawings.

DESCRIPTION OF EMBODIMENTS

The mode for carrying out the present invention will now be described in detail using embodiments.

Figure 6:
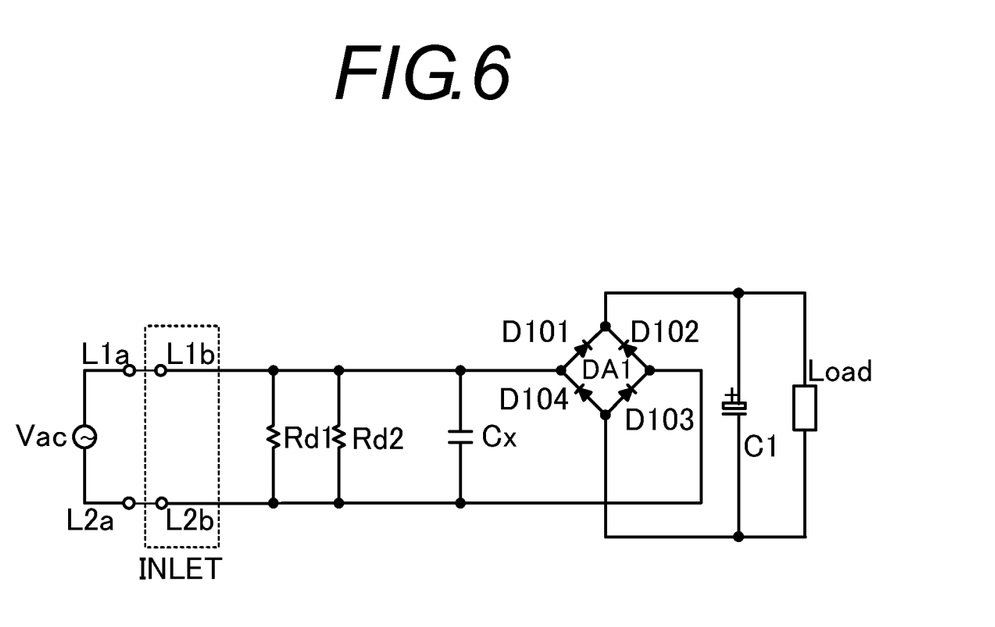
FIG. 6 is a circuit diagram showing the arrangement of a power supply apparatus as the premise of the present invention.

An arrangement as the premise of a power supply apparatus according to the present invention will be described with reference to FIG. 6. As shown in FIG. 6, two discharging resistors (Rd1 and Rd2) are connected in parallel. In this case, if an open fault has occurred in any one of them, the other can discharge an X capacitor Cx.

In the arrangement in which two discharging resistors are connected in parallel, the following is preferable. That is, even if an open fault has occurred in any one of the discharging resistors Rd1 and Rd2, a voltage V (1 sec) between inlets L1b and L2b 1 sec after pullout of them preferably has a value equal to or less than 36.8% ($=e^{-1}$) of an initial value $V_{pk}$. Letting $r_1$ be the resistance value of Rd1=the resistance value of Rd2, $$\tau \cong r_1 \cdot c \leq 1 \tag{6}$$

is preferably met. On the other hand, in a normal state, that is, a state in which no open fault has occurred in either of the discharging resistors Rd1 and Rd2, a power P' consumed by the discharging resistors Rd1 and Rd2 is approximately given by $$P' \cong \frac{V_{pk}^2}{r_1} \tag{7}$$

If an electrostatic capacitance c of the X capacitor Cx is 1.0 [μF], and the peak value of the commercial power supply voltage is 325 [Vdc] (=AC230 [Vrms]×√2), the resistance value $r_1$ of the discharging resistors Rd1 and Rd2 is preferably almost equal to or smaller than 1.0 [MΩ] from equation (6). In this case, P≈107 [mW] from equation (7). That is, the power consumption P' (≈107 [mW]) in the normal state when the two discharging resistors are connected in parallel is twice as large as the power consumption P (≈53 [mW]) when one discharging resistor is connected. When two discharging resistors (Rd1 and Rd2) are connected in parallel, the power consumption in the discharging resistors increases, as described above.

Examples of arrangements that cope with an open fault by providing plural discharging resistors and reduce the power consumption of the discharging resistors will be described below.

First Embodiment

Figure 1:
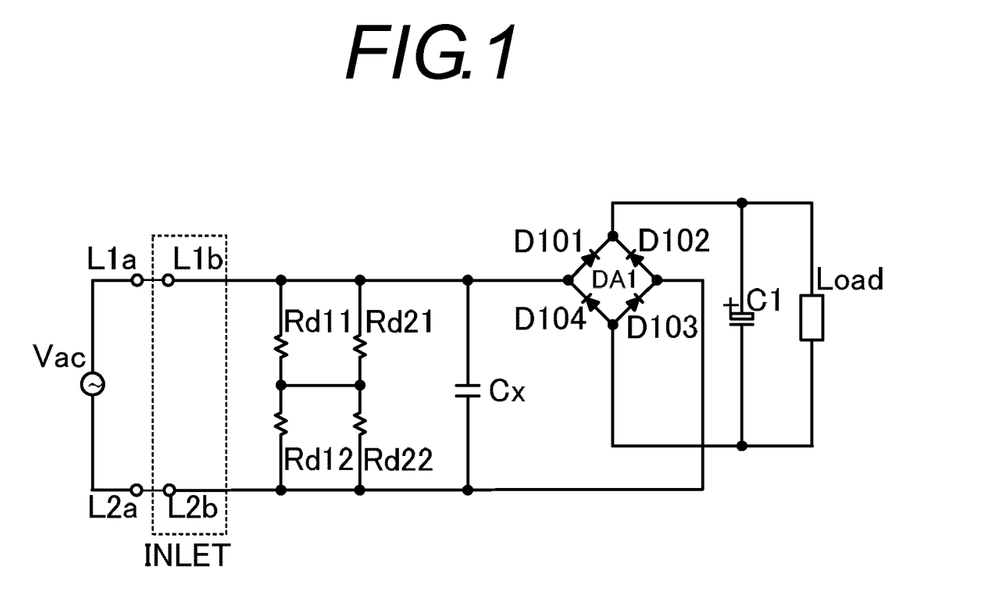
FIG. 1 is a circuit diagram showing the circuit arrangement of a power supply apparatus according to the first embodiment.

FIG. 1 shows a power supply apparatus according to the first embodiment. The power supply apparatus receives power of a commercial power supply Vac from inlets L1b (first input terminal) and L2b (second input terminal) connected to outlets L1a and L2a that are the output terminals of the commercial power supply Vac. An across the line capacitor (so-called X capacitor) Cx is connected between the inlets L1b and L2b to suppress noise superimposed on the commercial power supply voltage from being input to the power supply apparatus. The commercial power supply voltage supplied to the power supply apparatus is rectified by a bridge circuit DA1 formed from diodes D101, D102, D103, and D104 and smoothed by a primary electrolytic capacitor C1 so that an almost constant DC voltage is obtained. This DC voltage is supplied to a load Load such as an electronic device including the power supply apparatus of this embodiment.

In this embodiment, resistors Rd11 (first resistor) and a resistor Rd12 (second resistor) are connected in series between the inlets L1b and L2b (to be referred to as a first resistor group hereinafter). In addition, resistors Rd21 (third resistor) and a resistor Rd22 (fourth resistor) are connected in series between the inlets L1b and L2b (to be referred to as a second resistor group hereinafter). That is, the first resistor group and the second resistor group are connected in parallel to the X capacitor Cx. Furthermore, the connection part between the resistors Rd11 and Rd12 and the connection part between the resistors Rd21 and Rd22 are connected. That is, in this embodiment, plural resistors that form the discharging resistors are connected in a ladder pattern. Note that if no open fault has occurred in any of the resistors, and all the discharging resistors Rd11, Rd12, Rd21, and Rd22 have the same resistance value, the connection part between the resistors Rd11 and Rd12 and the connection part between the resistors Rd21 and Rd22 have an equipotential. The resistors Rd11, Rd12, Rd21, and Rd22 (to be referred to as the discharging resistors Rd11, Rd12, Rd21, and Rd22 hereinafter) serve as the discharging resistors of the X capacitor Cx.

Let $r_2$ be the resistance value of the discharging resistors Rd11, Rd12, Rd21, and Rd22. A time constant $\tau$ when an open fault has occurred in any one of the discharging resistors Rd11, Rd12, Rd21, and Rd22 is approximately given by $$\tau \cong \frac{3}{2} r_2 \cdot c \qquad (8)$$

Even if the open fault has occurred in any one of the discharging resistors, a voltage V (1 sec) between the inlets L1$b$ and L2$b$ 1 sec after pullout of them preferably has a value equal to or less than 36.8% ($=e^{-1}$) of an initial value $V_{pk}$. That is, $$\tau \cong r_0 \cdot c \qquad (9)$$

is preferably met.

On the other hand, in a normal state, that is, a state in which no open fault has occurred in any of the discharging resistors Rd11, Rd12, Rd21, and Rd22, a power P' consumed by the discharging resistors Rd11, Rd12, Rd21, and Rd22 is approximately given by $$P' \cong \frac{V_{pk}^2}{2r_2} \qquad (10)$$

Assume that an electrostatic capacitance c of the X capacitor Cx is 1.0 [μF], and the peak value of the commercial power supply voltage is 325 [Vdc] (=AC230 [Vrms]×√2). In this case, from equation (9), the resistance value $r_2$ of the discharging resistors Rd11, Rd12, Rd21, and Rd22 is preferably almost equal to or smaller than 670 [kΩ]. In this case, P'≈79 [mW] from equation (10). The arrangement of this embodiment can make the power consumption in the normal state smaller than the power consumption P' (≈107 [mW]) when two discharging resistors are connected in parallel, as described with reference to FIG. 6.

As described above, according to this embodiment, it is possible to quickly lower the voltage between the power-supply lines after pulling out the inlets and suppress the power consumption of the discharging resistors even if a fault or an error has occurred in the discharging resistors.

Second Embodiment

Figure 2:
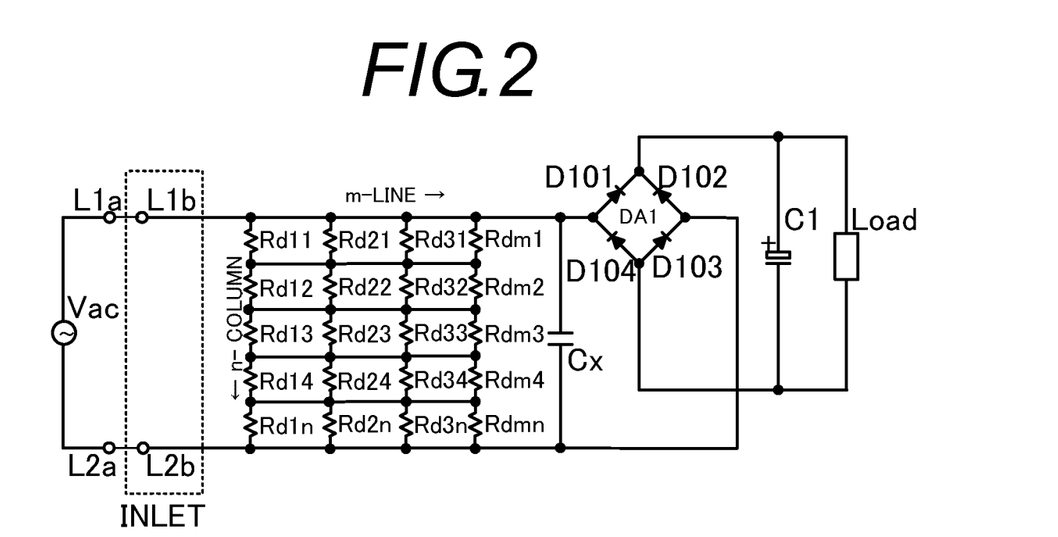
FIG. 2 is a circuit diagram showing the circuit arrangement of a power supply apparatus according to the second embodiment.

FIG. 2 shows a power supply apparatus according to the second embodiment. The same reference numerals as in FIG. 1 and the like denote the same parts, and a description thereof will be omitted. In the first embodiment, the discharging resistors are formed from the resistors Rd11, Rd12, Rd21, and Rd22. As the characteristic feature of the second embodiment, the discharging resistors are formed in a matrix of m lines×n columns.

More specifically, the following arrangement is formed. That is, resistors Rd11, Rd12, . . . , Rd1$n$ are connected in series to form a first series resistor group. Resistors Rd21, Rd22, . . . , Rd2$n$ are connected in series to form a second series resistor group. In addition, resistors Rdm1, Rdm2, . . . , Rdmn are connected in series to form an mth series resistor group. In this case, m≥2, and n≥2. The m series resistor groups from the first series resistor group to the mth series resistor group, which are plural resistor groups, are connected in parallel to an X capacitor Cx. The connection parts between the resistors of the first series resistor group are connected to the corresponding connection parts between the resistors of the second series resistor group, respectively. Similarly, the connection parts between the resistors of the second series resistor group are connected to the corresponding connection parts between the resistors of the third series resistor group, respectively. In this way, the connection parts between the resistors of the jth series resistor group are connected to the corresponding connection parts between the resistors of the (j+1) the series resistor group, respectively. That is, the connection parts between the resistors of each resistor group are connected to the corresponding connection parts between the resistors of each resistor group adjacent to the resistor group, respectively. In this case, 1≤j≤(m−1). Note that if no open fault has occurred in any of the resistors, and all the resistors that form the discharging resistors have the same resistance value, a predetermined connection part and a connection part adjacent to the predetermined connection part have an equipotential. For example, the connection part between the resistors Rd22 and Rd23 and the connection part between the resistors Rd32 and Rd33 have an equipotential.

The discharging resistors formed by connecting m×n resistors in a matrix of m lines×n columns will be referred to as a discharge resistor group Rdmn hereinafter. Let $r_3$ be the resistance value of all resistors in the discharge resistor group Rdmn. In this case, since the composite resistance value when an open fault has occurred in any one of the resistors is [{1/(m−1)+(n−1)/m}×$r_3$], a time constant $\tau$ is approximately given by $$\tau \cong \left( \frac{1}{m-1} + \frac{n-1}{m} \right) \cdot r_3 \cdot c \qquad (11)$$

Even if the open fault has occurred in any one of the discharging resistors, a voltage V (1 sec) between inlets L1$b$ and L2$b$ 1 sec after pullout of them preferably has a value equal to or less than 36.8% ($=e^{-1}$) of an initial value $V_{pk}$. That is, $$\tau \cong r_0 \cdot c \qquad (12)$$

is preferably met.

On the other hand, in a normal state, that is, a state in which no open fault has occurred in any of the resistors, the composite resistance value of the discharging resistors is (n/m× $r_3$). Hence, a power P' consumed by the discharging resistors is approximately given by $$P' \cong \frac{m}{n} \cdot \frac{V_{pk}^2}{2r_{31}} \qquad (13)$$

Assume that an electrostatic capacitance c of the X capacitor Cx is 1.0 [μF], and the peak value of the commercial power supply voltage is 325 [Vdc] (=AC230 [Vrms]×√2), m=5 lines, and n=5 columns. In this case, from equation (12), the resistance value $r_3$ of the discharge resistor group Rdmn is preferably almost equal to or smaller than 950 [kΩ]. In this case, P' 56 [mW] from equation (13). The arrangement of this embodiment can make the power consumption in the normal state smaller than the power consumption P' (≈107 [mW]) when two discharging resistors are connected in parallel, as described with reference to FIG. 6.

Note that as for the values m and n, when m=n=1, the same arrangement as in FIG. 5A is obtained. When m=2, and n=1, the same arrangement as in FIG. 6 is obtained. When m=1, and n=2, the arrangement includes two resistors connected in series. If an open fault has occurred in any one of the two resistors, discharging is impossible. For this reason, in the arrangement of this embodiment in which the resistors of the discharge resistor group Rdmn are connected in a matrix, m≥2, and n≥2 are set. The arrangement described in the first embodiment corresponds to the case in which m=n=2 in this embodiment.

As described above, according to this embodiment, it is possible to quickly lower the voltage between the power-supply lines after pulling out the inlets and suppress the power consumption of the discharging resistors even if a fault or an error has occurred in the discharging resistors.

Third Embodiment

Figure 3A:
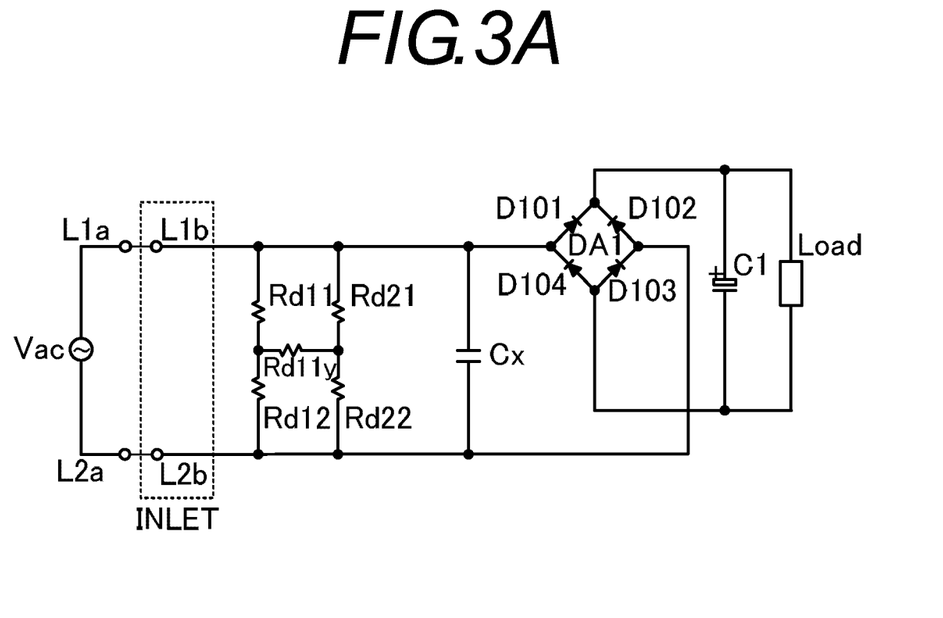
FIG. 3A is a circuit diagram showing the circuit arrangement of a power supply apparatus according to the third embodiment in which resistors are connected in a matrix of 2 lines by 2 columns.

FIG. 3A shows a power supply apparatus according to the third embodiment. The same reference numerals as in FIG. 1 and the like denote the same parts, and a description thereof will be omitted. Resistors Rd11 and Rd12 are connected in series between inlets L1b and L2b. Resistors Rd21 and Rd22 are connected in series between the inlets L1b and L2b. Additionally, in this embodiment, the connection part between the resistors Rd11 and Rd12 and the connection part between the resistor Rd21 and Rd22 are connected via a resistor Rd11y. Note that if no open fault has occurred in any of the resistors Rd11, Rd12, Rd21, and Rd22, and all the resistors have the same resistance value, the connection part between the resistors Rd11 and Rd12 and the connection part between the resistors Rd21 and Rd22 have an equipotential. The resistors Rd11, Rd12, Rd21, Rd22, and Rd11y serve as the discharging resistors of an X capacitor Cx.

Let $r_4$ be the resistance value of the resistors Rd11, Rd12, Rd21, Rd22, and Rd11y. A time constant $\tau_a$ when an open fault has occurred in any one of the resistors Rd11, Rd12, Rd21, and Rd22 is approximately given by $$\tau_a \cong \frac{5}{3} r_4 \cdot c \quad (14\text{-a})$$

On the other hand, a time constant $\tau_b$ when an open fault has occurred in the resistor Rd11y is approximately given by $$\tau_b \cong r_4 \cdot c \quad (14\text{-b})$$

Even if the open fault has occurred in any one of the resistors, a voltage V (1 sec) between the inlets L1b and L2b 1 sec after pullout of them preferably has a value equal to or less than 36.8% (=$e^{-1}$) of an initial value $V_{pk}$. Since $\tau_a > \tau_b$ from equations (14-a) and (14-b), it is preferable to comply with the following equation (15).

$$\tau_a \cong \frac{5}{3} r_4 \cdot c \leq 1 \quad (15)$$

In a normal state, that is, a state in which no open fault has occurred in any of the resistors Rd11, Rd12, Rd21, Rd22, and Rd11y, a power P' consumed by the discharging resistors is approximately given by $$P' \cong \frac{V_{pk}^2}{2r_4} \quad (16)$$

Assume that an electrostatic capacitance c of an X capacitor Cx is 1.0 [µF], and the peak value of the commercial power supply voltage is 325 [Vdc] (=AC230 [Vrms]×√2). In this case, from equation (15), the resistance value $r_4$ of the resistors Rd11, Rd12, Rd21, Rd22, and Rd11y is preferably almost equal to or smaller than 600 [kΩ]. In this case, P'≈88 [mW] from equation (16). The arrangement of this embodiment can make the power consumption in the normal state smaller than the power consumption P' (≈107 [mW]) when two discharging resistors are connected in parallel, as described with reference to FIG. 6.

Figure 3B:
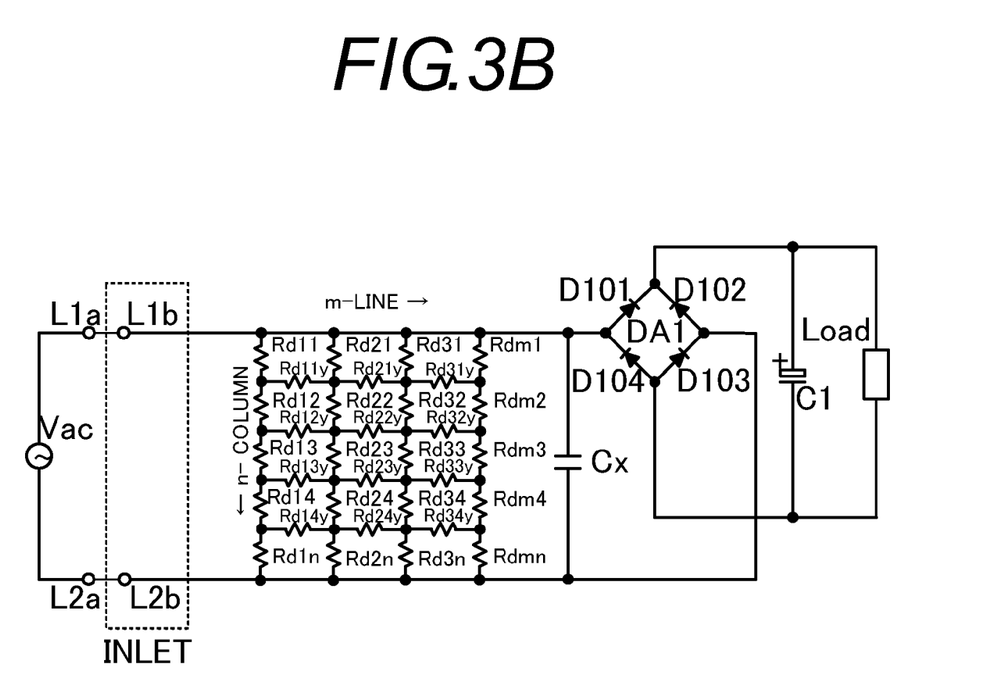
FIG. 3B is a circuit diagram showing the circuit arrangement of the power supply apparatus according to the third embodiment in which the resistors are connected in a matrix of m lines by n columns.

Note that when the resistors are connected in a matrix, as shown in FIG. 3B, the power consumption of the discharging resistors can further be suppressed. More specifically, as described in the second embodiment, resistors Rdm1, Rdm2, ..., Rdmn are connected in series to form a series resistor group of the mth line. The m series resistor groups from the first series resistor group to the series resistor group of the mth line are connected in parallel to the X capacitor Cx. In this embodiment, the connection parts between the resistors of the first series resistor group are connected to the corresponding connection parts between the resistors of the second series resistor group via the resistors Rd11y, Rd12y, ..., Rd1(n−1)y, respectively. Similarly, the connection parts between the resistors of the second series resistor group are connected to the corresponding connection parts between the resistors of the third series resistor group via resistors Rd21y, Rd22y, ..., Rd2(n−1)y, respectively. In this way, the connection parts between the resistors of the jth series resistor group are connected to the corresponding connection parts between the resistors of the (j+1) the series resistor group via resistors Rdjky, respectively. That is, the connection parts between the resistors of each resistor group are connected to the corresponding connection parts between the resistors of each resistor group adjacent to the resistor group via resistors, respectively. In this case, 1≤j≤(m−1), and 1≤k≤(n−1). Note that if no open fault has occurred in any of the resistors, and the resistance values of all the resistors that form the discharging resistors equal, a predetermined connection part and a connection part adjacent to the predetermined connection part have an equipotential. For example, the connection part between the resistors Rd22 and Rd23 and the connection part between the resistors Rd32 and Rd33 have an equipotential.

The same concept as in FIG. 3A applies to the arrangement shown in FIG. 3B assuming that all the resistors have the same resistance value. In this case, a case in which the open fault has occurred in any one of the resistors that form the jth series resistor group and a case in which the open fault has occurred in the resistor Rdjky connected to each connection part are divisionally considered, thereby obtaining the desired resistance value as in FIG. 3A. The power consumption P' in the normal state can be obtained, and the power consumption in the normal state can be made smaller than before, as can be seen.

Note that this embodiment is not limited to the resistor as long as the connection parts between the series resistor groups are connected via an impedance. The connection parts between the series resistor groups may be connected via, for example, a circuit module configured to exhibit a specific resistance value using semiconductor elements such as field effect transistors (FETs) or an element that combines a resistor and an inductor in series.

As described above, according to this embodiment, it is possible to quickly lower the voltage between the power-supply lines after pulling out the inlets and suppress the power consumption of the discharging resistors even if a fault or an error has occurred in the discharging resistors.

Fourth Embodiment

Each of the power supply apparatuses described in the first to third embodiments is applicable as, for example, a low-voltage power supply of an image forming apparatus, that is, a power supply that supplies power to a controller (control unit) or a driving unit such as a motor. The arrangement of the image forming apparatus to which the power supply apparatuses of the first to third embodiments are applied will be explained below.

Arrangement of Image Forming Apparatus

Figure 4:
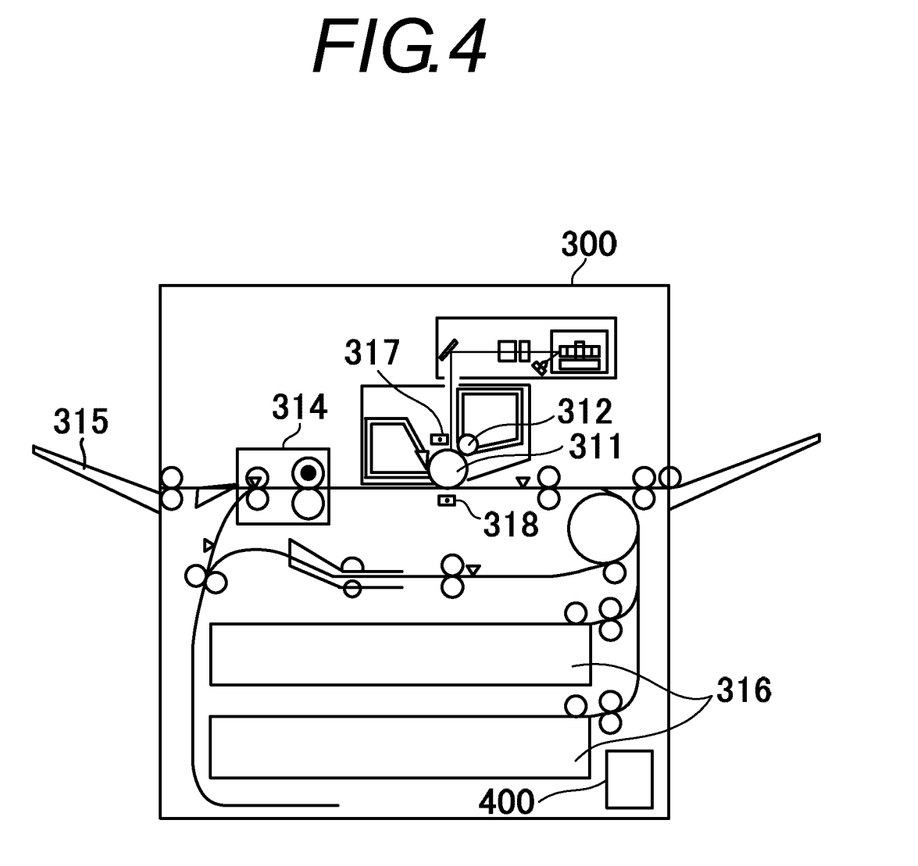
FIG. 4 is a view showing the arrangement of an image forming apparatus according to the fourth embodiment.

A laser beam printer will be exemplified as the image forming apparatus. FIG. 4 shows the schematic arrangement of a laser beam printer that is an example of an electrophotographic printer. A laser beam printer 300 includes a photosensitive drum 311 serving as an image carrier on which an electrostatic latent image is formed, a charging unit 317 (charging means) that uniformly charges the photosensitive drum 311, and a developing unit 312 (developing means) that develops the electrostatic latent image formed on the photosensitive drum 311 by toner. A transfer unit 318 (transfer means) transfers the toner image developed on the photosensitive drum 311 to a sheet (not shown) serving as a recording material supplied from a cassette 316. A fixing device 314 fixes the toner image transferred to the sheet and discharges the sheet to a tray 315. The photosensitive drum 311, the charging unit 317, the developing unit 312, and the transfer unit 318 constitute an image forming unit. The laser beam printer 300 also includes an power supply apparatus 400 described in the first to third embodiments. Note that the image forming apparatus to which the power supply apparatus 400 of the first to third embodiments is applicable is not limited to that illustrated in FIG. 4, and may be, for example, an image forming apparatus including plural image forming units. Alternatively, the image forming apparatus may be an image forming apparatus including a primary transfer unit that transfers the toner image on the photosensitive drum 311 to an intermediate transfer belt, and a secondary transfer unit that transfers the toner image on the intermediate transfer belt to a sheet.

The laser beam printer 300 includes a controller (not shown) that controls the image forming operation of the image forming unit or a sheet conveyance operation. The power supply apparatus 400 described in the first to third embodiments supplies power to, for example, the controller. The power supply apparatus 400 described in the first to third embodiments also supplies power to a driving unit such as a motor configured to rotate the photosensitive drum 311 or drive various kinds of rollers to convey the sheet. That is, a load Load of the first to third embodiments corresponds to the controller or the driving unit. In the power supply apparatus 400 of the image forming apparatus of this embodiment, the discharging resistors are connected in a ladder pattern. Even if an open fault has occurred in any one of the discharging resistors connected in the ladder pattern, it is possible to quickly lower the voltage between inlets L1b and L2b after pullout of them. Additionally, in the image forming apparatus of this embodiment, in a normal state in which no open fault has occurred in any of the discharging resistors of the power supply apparatus 400, the power consumption of the discharging resistors can be reduced.

As described above, according to this embodiment, it is possible to quickly lower the voltage between the power-supply lines after pulling out the inlets and suppress the power consumption of the discharging resistors even if a fault or an error has occurred in the discharging resistors of the power supply apparatus included in the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-171145, filed Aug. 1, 2012, and No. 2013-106152, filed May 20, 2013 which are hereby incorporated by reference herein in their entirety.

The invention claimed is:

1. A discharge circuit for discharging a voltage charged to a capacitor connected between input lines of an alternative voltage, comprising:
   a first circuit including plural resistors connected in series and connected between the input lines; and
   a second circuit including plural resistors connected in series and connected between the input lines,
   wherein a connection part between the plural resistors of the first circuit and a connection part between the plural resistors of the second circuit are connected.

2. A discharge circuit according to claim 1, wherein a number of the plural resistors in each of the first circuit and the second circuit is two or more.

3. A discharge circuit according to claim 1, wherein in a case where any one of the plural resistors of the first circuit and the second circuit is failed, a time required to discharge a voltage charged to the capacitor to a predetermined value is equal to or less than 1 second.

4. A discharge circuit according to claim 1, wherein each of the plural resistors of the first circuit and the plural resistors of the second circuit has the same resistance value.

5. A discharge circuit according to claim 1, wherein the connection parts between the plural resistors of the first circuit and the connection parts between the plural resistors of the second circuit are connected via a resistor.

6. A power supply apparatus comprising:
   a capacitor connected between input lines of an alternative voltage;
   a rectifying and smoothing unit that rectifies and smoothes the alternative voltage and outputs the alternative voltage;
   a first circuit including plural resistors connected in series and connected between the input lines; and
   a second circuit including plural resistors connected in series and connected between the input lines,
   wherein a connection part between the plural resistors of the first circuit and a connection part between the plural resistors of the second circuit are connected.

7. A power supply apparatus according to claim 6, wherein a number of the plural resistors in each of the first circuit and the second circuit is two or more.

8. A power supply apparatus according to claim 6, wherein in a case where any one of the plural resistors of the first circuit and the second circuit is failed, a time required to discharge a voltage charged to the capacitor to a predetermined value is equal to or less than 1 second.

9. A power supply apparatus according to claim 6, wherein each of the plural resistors of the first circuit and the plural resistors of the second circuit has the same resistance value.

10. A power supply apparatus according to claim 6, wherein the connection parts between the plural resistors of the first circuit and the connection parts between the plural resistors of the second circuit are connected via a resistor.

11. An image forming apparatus for forming an image on a recording material, comprising:
   an image forming unit that forms an image; and
   a power supply that supplies power to the image forming apparatus,
   wherein the power supply includes a capacitor connected between input lines of an alternative voltage, a rectifying and smoothing unit that rectifies and smoothes the alternative voltage and outputs the alternative voltage, a first circuit including plural resistors connected in series and connected between the input lines, and a second circuit including plural resistors connected in series and connected between the input lines, wherein a connection part between the plural resistors of the first circuit and a connection part between the plural resistors of the second circuit are connected.

12. An image forming apparatus according to claim 11, wherein a number of the plural resistors in each of the first circuit and the second circuit is two or more.

13. An image forming apparatus according to claim 11, wherein in a case where any one of the plural resistors of the first circuit and the second circuit is failed, a time required to discharge a voltage charged to the capacitor to a predetermined value is equal to or less than 1 sec.

14. An image forming apparatus according to claim 11, wherein each of the plural resistors of the first circuit and the plural resistors of the second circuit has the same resistance value.

15. An image forming apparatus according to claim 11, wherein the connection parts between the plural resistors of the first circuit and the connection parts between the plural resistors of the second circuit are connected via a resistor.

16. An image forming apparatus according to claim 11, further comprising a controller that controls an operation of a driving unit,
   wherein the power supply supplies the power to the controller.

* * * * *